United States Patent
Ren et al.

(10) Patent No.: US 10,553,021 B2
(45) Date of Patent: Feb. 4, 2020

(54) SYSTEM AND METHODS FOR INTERACTIVE HYBRID-DIMENSION MAP VISUALIZATION

(71) Applicant: Robert Bosch GmbH, Stuttgart (DE)

(72) Inventors: Liu Ren, Cupertino (CA); Lei Yang, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/538,165

(22) PCT Filed: Dec. 22, 2015

(86) PCT No.: PCT/US2015/067461
§ 371 (c)(1),
(2) Date: Jun. 20, 2017

(87) PCT Pub. No.: WO2016/106358
PCT Pub. Date: Jun. 30, 2016

(65) Prior Publication Data
US 2018/0005434 A1 Jan. 4, 2018

Related U.S. Application Data

(60) Provisional application No. 62/095,372, filed on Dec. 22, 2014.

(51) Int. Cl.
*G06T 17/05* (2011.01)
*G06T 15/20* (2011.01)
(Continued)

(52) U.S. Cl.
CPC ............ *G06T 17/05* (2013.01); *G01C 21/367* (2013.01); *G06T 15/205* (2013.01);
(Continued)

(58) Field of Classification Search
None
See application file for complete search history.

(56) References Cited

U.S. PATENT DOCUMENTS 8,471,732 B2 6/2013 Ren et al.
8,885,882 B1 11/2014 Yin et al.
(Continued)

FOREIGN PATENT DOCUMENTS

JP 2005-292064 A 10/2005
WO 2016/106365 A1 6/2016

OTHER PUBLICATIONS

Hawkes et al. Lessons learnt building ViziCities, posted @https://hacks.mozilla.org/2014/03/lessons-learnt-building-vizicities on Mar. 5, 2014 (Year: 2014).*

(Continued)

*Primary Examiner* — Yingchun He
(74) *Attorney, Agent, or Firm* — Maginot, Moore & Beck LLP (57) ABSTRACT

A navigational system includes a hybrid-dimensional visualization scheme with a multi-modal interaction flow to serve for digital mapping applications, such as in car infotainment systems and online map services. The hybrid-dimensional visualization uses an importance-driven or focus-and-context visualization approach to combine the display of different map elements, including 2D map, 2D building footprint, 3D map, weather visualization, realistic day-night lighting, and POI information, into a single map view. The combination of these elements is guided by intuitive user interactions using multiple modalities simultaneously, such that the map information is filtered to best respond to the user's request, and presented in a way that presents both the focus and the context in a map in an aesthetic manner. The system facilitates several use cases (Continued)

that are common to the users, including destination preview, destination search, and virtual map exploration.

10 Claims, 6 Drawing Sheets

(51) Int. Cl.
  *G01C 21/36* (2006.01)
  *G06F 3/0481* (2013.01)
  *G06F 3/0488* (2013.01)
(52) U.S. Cl.
  CPC ...... *G06F 3/04815* (2013.01); *G06F 3/04883* (2013.01); *G06T 2200/24* (2013.01); *G06T 2215/16* (2013.01)

(56) References Cited

U.S. PATENT DOCUMENTS

| | | | | |
|---|---|---|---|---|
| 9,430,858 | B1* | 8/2016 | Har | G01C 21/32 |
| 2007/0273558 | A1* | 11/2007 | Smith | G08G 1/0962 |
| | | | | 340/995.1 |
| 2008/0294332 | A1 | 11/2008 | Levanon et al. | |
| 2009/0110327 | A1* | 4/2009 | Chen | G06T 17/10 |
| | | | | 382/285 |
| 2009/0273601 | A1 | 11/2009 | Kim | |
| 2011/0141136 | A1 | 6/2011 | Cardno et al. | |
| 2013/0080504 | A1* | 3/2013 | Maurer | G06F 17/30241 |
| | | | | 709/203 |
| 2014/0019917 | A1 | 1/2014 | Piemonte et al. | |
| 2014/0071119 | A1* | 3/2014 | Piemonte | G06T 17/05 |
| | | | | 345/419 |
| 2014/0267282 | A1 | 9/2014 | Ren et al. | |
| 2014/0277939 | A1 | 9/2014 | Ren et al. | |

OTHER PUBLICATIONS

ViziCities Launch Demo, downloaded @https://www.youtube.com/watch?v=NcxprYp-J4Q&feature=youtu.be, posted on Feb. 2014 (Year: 2014).*

Trapp, Dissertation Interactive Rendering Technilues for Focus+Context Visualization of 3D Geovirtual Environments, posted Jan. 23, 2013 (Year: 2013).*

Mister F., North American downtowns in 3 dimensions, posted on Dec. 17, 2007, downloaded @ http://forum.skyscraperpage.com/showthread.php?t=142934 (Year: 2007).*

International Search Report corresponding to PCT Application No. PCT/US2015/067461, dated Apr. 6, 2016 (3 pages).

Iphoneness.com; 10 Best iPhone GPS Apps for Drivers; May 18, 2013 (22 pages).

Brooks et al.; A 2D/3D Hybrid Geographical Information System. Proceedings of ACM GRAPHITE, Dunedin, Dec. 2005, available at https://web.cs.dal.ca/~sbrooks/projects/hybridGIS/Brooks-Graphite-2005b.pdf (9 pages).

Alagarraj, V.; Hybrid 3D Modeling of Large Landscapes from Satellite Maps; Project in Lieu of Thesis for Master's Degree The University of Tennessee, Knoxville; 2003 (62 pages).

Dilger, D.; iOS 7 Maps go full screen, navigation gets night mode, new Siri options; Jul. 12, 2013 (18 pages).

Fullpower Technologies, Inc.; MotionX-GPS Drive, User Manual, Revision 16.0; Aug. 2013 (35 pages).

Garmin Würzburg GmbH; NAVIGON Southern Africa; NAVIGON GPS sat nav for Southern Africa; Dec. 5, 2014 (4 pages).

Kol et al.; Real-time Canonical-angle Views in 3D Virtual Cities; Proceedings of the Eurographics Conference on Vision, Modeling, and Visualization; 2014 (8 pages).

Semmo et al.; Interactive Visualization of Generalized Virtual 3D City Models using Level-of-Abstraction Transitions; Eurographics Conference on Visualization (EuroVis) 2012; 2012 (Author's Version) (10 pages).

Pasewaldt et al.; Multiscale Visualization of 3D Geovirtual Environment Using View-Dependent Multi-Perspective Views; 2011 (Draft Version) (8 pages).

Qu et al.; Focus+Context Route Zooming and Information Overlay in 3D Urban Environments; IEEE Transactions on Visualization and Computer Graphics; Nov./Dec. 2009; pp. 1547-1554; vol. 15, No. 6; IEEE Computer Society (8 pages).

Möser et al.; Context Aware Terrain Visualization for Wayfinding and Navigation; Pacific Graphics 2008; 2008 (8 pages).

Supplementary European Search Report corresponding to European Patent Application No. 15 87 4330 (14 pages).

Perez, Sarah, "Mobile Weather App Minutely Lets you "Correct" The Weather, Visualize Storms in 3D", retrieved from internet Oct. 17, 2018: http://web.archive.org/web/20160926090258/https://techcrunch.com/2013/08/05/mobile-weather-app-minutely-lets-you-correct-the-weather-visualize-storms-in-3d/, 2013 (2 pages).

Partial Supplementary European Search Report corresponding to European Application No. 15874330.2, dated Jun. 7, 2018 (13 pages).

Trapp M et al, "3D Generalization Lenses for Interactive Focus + Context Visualization of Virtual City Models," Information Visualisation, 2008, 12th International Conference, IEEE, Piscataway, NJ, USA, Jul. 9, 2008, pp. 356-361.

Yu-Shuen Wang et al, "Focus+Context Metro Maps," IEEE Transactions on Visualization and Computer Graphics, IEEE Service Center, Los Alamitos, CA, US, vol. 17, No. 12, Dec. 1, 2011, pp. 2528-2535.

* cited by examiner

FIG. 1
(CONTINUED)

(A) SUNNY 132

(B) OVERCAST 136

(C) RAINY 140

SYSTEM AND METHODS FOR INTERACTIVE HYBRID-DIMENSION MAP VISUALIZATION

CLAIM OF PRIORITY

This application is a 35 U.S.C. § 371 National Stage Application of PCT/US2015/067461, filed on Dec. 22, 2015, which claims priority to U.S. Provisional Application No. 62/095,372, filed on Dec. 22, 2014, the disclosures of which are herein incorporated by reference in their entirety.

FIELD

This disclosure relates generally to the field of driver information and driver assistance systems (also known as in-vehicle information systems) and, more specifically, to systems and methods that provide graphical displays to a vehicle operator for mapping and navigation applications. This disclosure also relates to any system that leverages two-dimensional or three-dimensional geographic information systems (GIS) for the purpose of virtual city exploration, or more generally, providing online map services.

BACKGROUND

Modern motor vehicles and mobile electronic devices often provide mapping and navigation applications to assist a user while driving or traveling. Existing digital mapping systems typically provide two modes for map display: two-dimensional (2D) and three-dimensional (3D). A 2D map is best used for understanding urban layout and route planning, whereas a 3D map is best suited for appearance recognition. Both modes have their drawbacks as well. With a 2D map, it is not possible to see the building shapes and appearances. A map of Manhattan may appear similar to the map of a small downtown in 2D. While the user can certainly switch to a 3D map view to get additional information, the 3D map often looks cluttered with important elements such as road occluded by buildings. It is therefore difficult for the user to establish a connection between these two modes in order to form a complete image of the geographic region in mind.

While some prior art systems attempt to combine 2D and 3D maps in a single display, the maps often lack contextual information that assists the user in interpreting the maps and finding meaningful information without suffering from information overload when the system presents overly complicated or confusing graphics. As a result, the application of these methods can be limited. Consequently, improvements to the input and graphical generation processes in mapping and navigation systems to generate map displays that combine appropriate 2D, 3D, and contextual information would be beneficial.

SUMMARY

In one embodiment, a method for generating a hybrid map display incorporating both two-dimensional and three-dimensional graphical elements has been developed. The method includes generating with a processor a graphical display of a two-dimensional base map with a display device, receiving with a multi-modal input device a user selection of a region of interest in the two-dimensional base map, the region of interest corresponding to only a portion of the two-dimensional base map, identifying with the processor a first footprint region in the two-dimensional base map, the first footprint region including the region of interest and a first portion of the two-dimensional base map outside of the region of interest, generating a three-dimensional graphical display of at least one building, terrain feature, or landmark located within the region of interest with the graphical display device, and generating a first two-dimensional graphical display in the first footprint region including at least one graphical element not present in the two-dimensional base map with the graphical display device.

In another embodiment, a graphical display system that generates a hybrid map display incorporating both two-dimensional and three-dimensional graphical elements has been developed. The system includes a graphical display device configured to display two-dimensional and three-dimensional graphics including a map and features on a map, a multi-modal input device, and a processor operatively connected to the graphical display device and the multi-modal input device. The processor is configured to generate a graphical display of a two-dimensional base map with the graphical display device, receive with the multi-modal input device a user selection of a region of interest in the two-dimensional base map, the region of interest corresponding to only a portion of the two-dimensional base map, identify a first footprint region in the two-dimensional base map, the first footprint region including the region of interest and a first portion of the two-dimensional base map outside of the region of interest, generate a three-dimensional graphical display of at least one building, terrain feature, or landmark located within the region of interest with the graphical display device, and generate a first two-dimensional graphical display in the first footprint region including at least one graphical element not present in the two-dimensional base map with the graphical display device.

Various aspects of the systems and methods described herein include the combination of 2D map, 2D building footprints, 3D map, artistic elements (artistic strokes as in 3D artistic map), and context information (weather, POI, time, lighting, etc.) in the same map view with proper transition and a multi-modal interaction flow that allows the user to easily specify the area of interest and related context information simultaneously, using touch, gesture, voice, and gaze. The systems and methods include the combination of visualization, interaction flow and a time-lapse animation to visualize time and weather changes that are related to a user request. A graphical mapping system combines these features to provide interactive map use cases including destination preview, destination search, and virtual city exploration. A method combines the visualization of 2D map, 2D building footprints, 3D urban scene and context information (weather, POI, time, lighting, etc.) in a single map display. A combination of the above features with an animation scheme to facilitate easy, information-rich interaction flow for destination preview, destination search, and virtual map exploration.

The methods disclosed in this document can be useful in the following use cases in a geographical information system for the generation of a destination preview of a trip, which shows the destination in focus with context in hybrid-dimension visualization with additional context of the event at the destination. Context includes, but is not necessarily limited to, weather, time, and additional relevant information. In a destination search, a display shows and highlights potential POI to a user to assist the decision of a destination. The hybrid-dimensional visualization scheme provides a platform to display information-rich contents such as 3D appearance, weather, and POI information in an interactive way. In virtual map exploration, a display combines the benefits of 2D map (clear road network, no occlusion, intuitive map understanding) and context-aware 3D map (realistic appearance, 3D shape recognition, weather visualization, time change, non-cluttered POI information) in a single map display with user interaction to specify interests.

In one embodiment, a navigational system includes a hybrid-dimensional visualization scheme with a multi-modal interaction flow to serve for digital mapping applications, such as in car infotainment systems and online map services. The hybrid-dimensional visualization uses an importance-driven or focus-and-context visualization approach to combine the display of different map elements, including 2D map, 2D building footprint, 3D map, weather visualization, realistic day-night lighting, and POI information, into a single map view. The combination of these elements is guided by intuitive user interactions using multiple modalities simultaneously, such that the map information is filtered to best respond to the user's request, and presented in a way that presents both the focus and the context in a map in an aesthetic manner. The system facilitates several use cases that are common to the users, including destination preview, destination search, and virtual map exploration.

The proposed system and methods enable filtering of information to generate a hybrid graphical display in an in-vehicle information system or other mapping and navigation application. The system implements filtering based on multi-modal user input to generate accurate graphical depictions of different points of interest (POIs) with additional contextual information to enable a user to use the maps for destination selection and navigation without information overload.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "in-vehicle information system" refers to a computerized system that is associated with a vehicle for the delivery of information to an operator and other occupants of the vehicle. An in-vehicle information system is also referred to as a driver assistance system or driver information system. In motor vehicles, the in-vehicle information system is often physically integrated with the vehicle and is configured to receive data from various sensors and control systems in the vehicle. In particular, some in-vehicle information systems receive data from navigation systems including satellite-based global positioning systems and other positioning systems such as cell-tower positioning systems and inertial navigation systems. Some in-vehicle information system embodiments also include integrated network devices, such as wireless local area network (LAN) and wide-area network (WAN) devices, which enable the in-vehicle information system to send and receive data using data networks. Data may also come from local data storage device. In an alternative embodiment, a mobile electronic device provides some or all of the functionality of an in-vehicle information system. Examples of mobile electronic devices include smartphones, tablets, notebook computers, handheld GPS navigation devices, and any portable electronic computing device that is configured to perform mapping and navigation functions. The mobile electronic device optionally integrates with an existing in-vehicle information system in a vehicle, or acts as an in-vehicle information system in vehicles that lack built-in navigation capabilities including older motor vehicles, motorcycles, aircraft, watercraft, and many other vehicles including, but not limited to, bicycles and other non-motorized vehicles.

Figure 1:
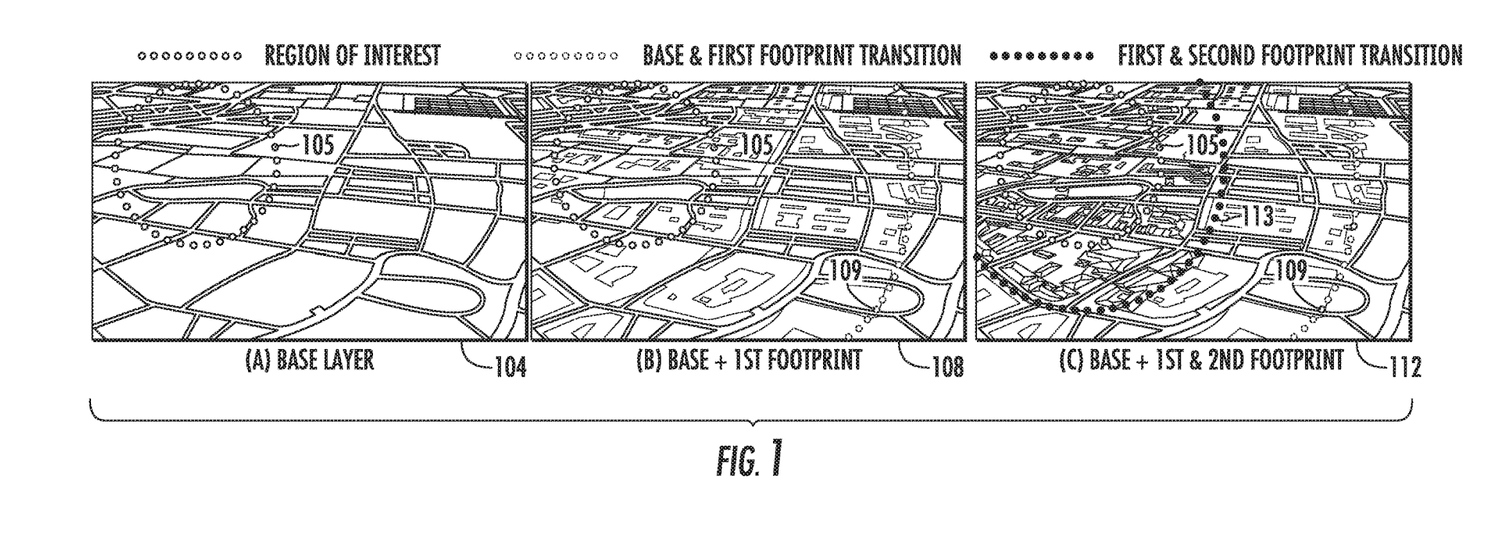
FIG. 1 is a set of displays of a map depicting selection of a region of interest, generation of a hybrid 2D and 3D map display including a 3D depiction of the region of interest, and a display of contextual data in the map.

FIG. 1 depicts a series of graphical displays for a hybrid 2D and 3D map that presents map and point of interest (POI) information to a user using a combination of 2D graphical elements, 3D graphical elements, and contextual information graphics. The displays of FIG. 1 are generated using a graphical display device, such as the graphical display device 232 that is described in more detail below in conjunction with an in-vehicle information system 200. In FIG. 1, the display 104 depicts a 2D map. The 2D map is shown in a perspective view to give the illusion of the user viewing a 2D map from a birds-eye angle view, but the map itself does not depict 3D objects. In the view 104, the region of interest 105 depicts a region of the 2D map that a user selects for the display of a greater detail of information for POIs and other features within the region of interest. As described in more detail below, the user selects a region of interest using one or more input devices. The view 108 depicts a first footprint region 109 around the region of interest 105 where the graphical depiction includes additional details such as a monochromatic 2D depiction of buildings that are placed over the 2D base map graphic. The view 112 includes a second footprint region 113 that is slightly larger than the region of interest 105 but smaller than the first footprint region 109. The second footprint region 113 includes a colored, top-down flattened view of 3D objects, such as terrain features, buildings, and other landmarks, to illustrate features within and around the region of interest 105 in a greater degree of detail. The region of the first footprint 109 that is outside of the second footprint 113 includes a reduced-detail depiction of 2D map features, street name labels, and optionally POI tags on the map. The region of the map display that is further outside of the first footprint 109 only includes the base 2D map. While the views 104, 108, and 112 depict a single region of interest, some map configurations depict two or more separate regions of interest in a similar manner.

In FIG. 1, the views 116-128 depict a series of images that are produced in an animation sequence to generate a detailed hybrid 2D and 3D map showing 3D map features and contextual data around the region of interest 105, while other portions of the map display remain as 2D images. The view 116 depicts the 2D map with additional indicators, such as text or graphical icons, for points of interest on the map. The views 120-128 depict 3D objects, such as buildings in a city, which appear to "grow" from the surface of the 2D map in and around the region of interest 105. In the animation ending state view 128, 3D map features and contextual data around region 105 are shown on top of the 2D map view 112. The region of interest in views 120-128 also depict contextual feature data such as a depiction of the weather over the region of interest. For example, the views 132-140 depict the same region of interest under sunny daylight conditions (view 132), cloudy daytime conditions (view 136), and rainy daytime conditions (view 140). In one embodiment, the GPU 216 in the processor 204 applies different lighting effects to the region of interest to brighten all of the three-dimensional objects within the region of interest for sunny weather conditions or to apply a darkening effect for cloudy conditions and a further darkening effect for rainy conditions. During operation, the processor 204 receives weather report information corresponding to a region of interest either from an external server or from sensors within a vehicle or mobile electronic device to identify the weather conditions and generate suitable graphical effects. As described in more detail below, the hybrid 2D and 3D map view optionally includes procedurally generated lighting effects to simulate different times of day and night conditions. The contextual effects in the region of interest 105 gradually transition to the second footprint layer in the 2D map around region 105, to avoid abrupt and unnatural change in appearance.

As shown in FIG. 1, the 2D map visualization includes three layer components. The base layer is a traditional 2D map with only road and land use markings. The first footprint layer is a monotone building footprint overlay onto the base layer. The second footprint layer is a colored building footprint, which is in a closer appearance to the 3D display. To properly blend these layers to provide a focus+ context visualization, we expand the region of interest by offsetting its boundary, and create three bands of map visualization surrounding the area of interest. Those bands are (from near to far): second (color) footprint, first (monotone) footprint, base layer. Neighboring bands have smooth transition in between to avoid abrupt changes in appearance.

With this type of visualization, the outer band shows the peripheral area, which is not very important to the user given the specified area of interest. It mainly serves as a context to the current map view by giving a sense of location. The middle band shows footprints of buildings, which gives a sense of how these areas are occupied. The inner band shows colored footprints. By using color it not only better reveals the appearance of buildings, but also provides a better transition to the 3D display of the center of interest, without introducing occlusion and too much visual clutter.

Figure 2:
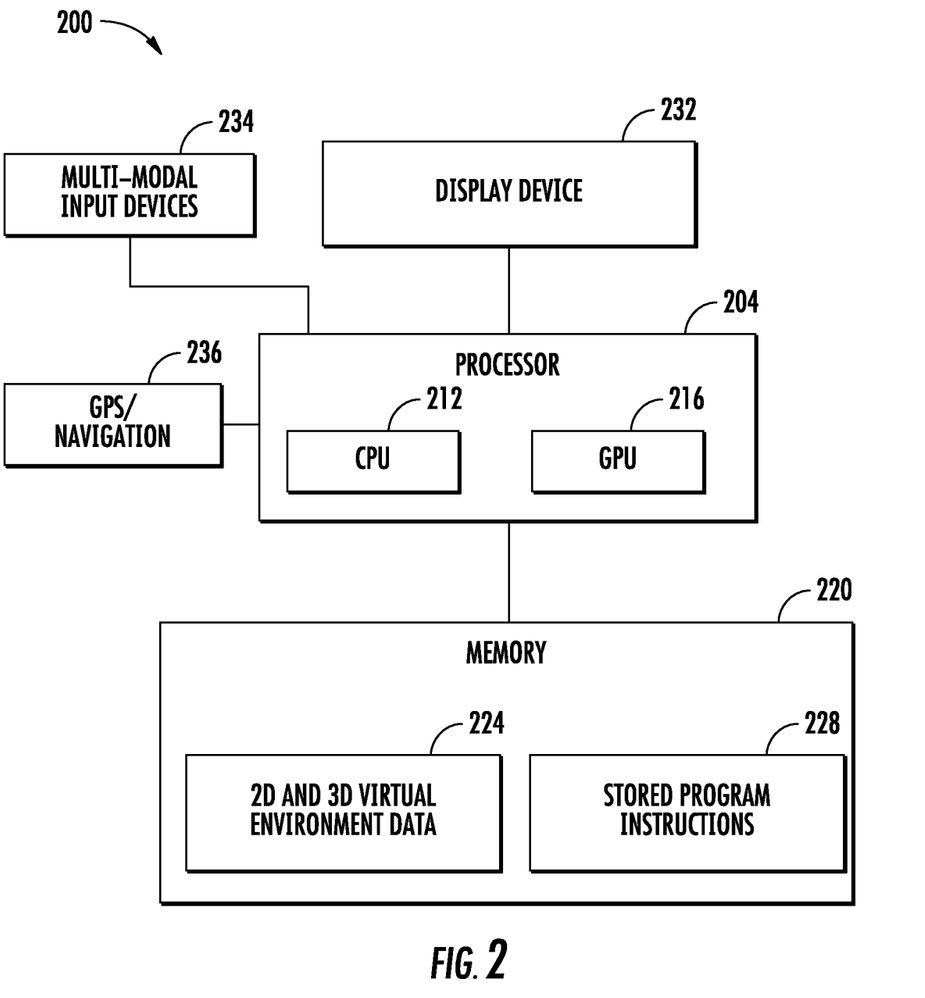
FIG. 2 is a block diagram of an illustrative embodiment of a computing device that generates the graphics of FIG. 1.

FIG. 2 depicts an in-vehicle information system 200 that generates a graphical display of a hybrid 2D and 3D map including a 3D graphical representation of a POI and contextual information. The in-vehicle information system 200 includes a processor 204, memory 220, display 232, multi-modal input devices 234, and optional positioning system 236. Hardware embodiments of the in-vehicle information system 200 include, but are not limited to, personal computer (PC) hardware, embedded system hardware including embedded computing hardware for use in a motor vehicle. While FIG. 2 depicts an in-vehicle information system, in an alternative embodiment the components in the system 200 are incorporated in a mobile electronic device such as a smartphone, tablet, wearable, or other portable computing device.

In the in-vehicle information system 200, the processor 204 includes one or more integrated circuits that implement the functionality of a central processing unit (CPU) 212 and graphics processing unit (GPU) 216. In some embodiments, the processor is a system on a chip (SoC) that integrates the functionality of the CPU 212 and GPU 216, and optionally other components including the memory 220 and positioning system 236, into a single integrated device. In other embodiments, the processor 204 includes separate CPU and GPU devices that communicate with one another via a PCI express data connection or other suitable data communication devices. In one embodiment, the CPU is a commercially available central processing device that implements an instruction set such as one of the x86, ARM, Power, or MIPS instruction set families. The GPU includes hardware and software for display of both 2D and 3D graphics. In one embodiment, processor 204 executes software drivers and includes hardware functionality in the GPU 216 to generate 3D graphics using the OpenGL, OpenGL ES, Vulkan, Metal, or Direct3D graphics application programming interfaces (APIs). The GPU 216 includes one or more hardware execution units that implement various fixed-function and programmable processing elements including, for example, fragment shaders, geometry shaders, tessellation shaders, vertex shaders, and texture units for the processing and display of 2D and 3D graphics. During operation, the CPU 212 and GPU 216 execute stored programmed instructions 228 that are retrieved from the memory 220. In one embodiment, the stored programmed instructions 228 include operating system software and one or more software application programs that generate 3D graphics, including mapping and navigation applications.

The memory 220 includes both non-volatile memory and volatile memory. The non-volatile memory includes solid-state memories, such as NAND flash memory, magnetic and optical storage media, or any other suitable data storage device that retains data when the in-vehicle information system 200 is deactivated or loses electrical power. The volatile memory includes static and dynamic random access memory (RAM) that stores software and data, including graphics data and map feature data, during operation of the in-vehicle information system 200. The memory 220 also stores 3D and 3D virtual environment data 224 that includes graphical data to enable the in-vehicle information system 200 to generate hybrid 2D and 3D map graphics along with contextual information for one or more POIs. The 2D and 3D virtual environment data include data for terrain, roads, routes, 3D objects including static buildings and moving objects such as the vehicle, and optionally other graphical effects including time of day lighting, building lighting, and weather effects.

In the in-vehicle information system 200, the multi-modal input devices 234 include two or more input devices that are configured to receive user input to identify a region of interest in a map that is presented through the graphical display device 232. Examples of multi-modal input devices include, but are not necessarily limited to, touchscreen or other touch sensitive input devices, three-dimensional gesture input devices, speech input devices, eye tracking devices, and key pad or other tactile input devices. As described in more detail below, the in-vehicle information system 200 receives input through the multi-modal input devices 234 to select a region of interest in a map display. The system 200 generates three-dimensional images and other contextual information for only the region of interest while the remaining portions of the map display are rendered in a lower-detail two-dimensional mode to present the information about the region of interest to the user with minimal occlusion and distraction.

Examples of input modes for the multi-modal input devices 234 are set forth below. The different input modes can be used separately or in combination in different embodiments of the system 200. In a touch input mode, the user uses a touch input device to specify the region of interest for 3D and context highlight. The touch input can either be a closed region, such as a circle, ellipse, or an arbitrary closed curve, or an open curve such as a curved path along a street. In the former case, the system will show 3D contents and enhanced context information within the closed region. In the latter case, the system will show these contents and information within a fixed width along the curved path. In both cases, the system will generate different offsets of the region boundary at fixed distances, which will guide the transition of different level of details in the hybrid 2D and 3D map.

In a gesture input mode, the system 200 detects hand gestures from the user to specify the region of interest. In one embodiment, the system 200 uses a 3D sensing device such as a depth camera or other suitable 3D sensor to capture gestures from the user. The user uses hand position to indicate where to draw in the map, and use finger gesture to indicate initialization of drawing. Similar to touch inputs, the gesture input can also be used with other modalities such as voice. Compared to touch inputs, the gesture allows more freedom in drawing but is potentially less accurate.

A voice input device enables the user to provide spoken input to the system 200. The system 200 enables simultaneous inputs from both touch/gesture and voice in the multi-modal input devices 234. The voice channel can contain the user's command to direct and filter results. For example, the user can say "Find restaurants in this area", or "Find historical sites in this area". The user can also say "Show weather in this area at 6 PM" or "Find lunch places in this area for tomorrow". The voice engine interprets the commands by extracting the time and contextual information, which will be used to direct the visualization of the region of interest.

In some use cases, either when the destination is predefined or when the user cannot use hands to provide graphical input (e.g. during driving), the voice can be used solely to direct the visualization. For example, the user can say "show my next destination" or "show the area near golden gate bridge". In these cases the system can directly infer the region of interest from the voice command, without the need of additional inputs.

Some embodiments of the system 200 use a gaze input tracking device to receive input based on the eye movements and eye focus of the user. The gaze input from the user is detected using eye tracking devices. This type of input is particularly useful for hands-free operation of the system. Instead of using touch or gesture to specify the region of interest, the user can simply stare at a location for a period of time, for example 3 seconds, and the system will assume the an area around the stared location is the region of interest. Alternatively the user can stare at the location and at the same time say voice commands like "Find restaurants in this area", and the system 200 identifies the region of interest from the location of the gaze when the voice command ends.

The in-vehicle information system 200 includes an optional positioning system device 236 that is operatively connected to the processor 204. Examples of positioning systems include global positioning system (GPS) receivers, radio triangulation receivers that identify a location of the in-vehicle information system 200 with respect to fixed wireless transmitters, and inertial navigation systems. During operation, the processor 204 executes mapping and navigation software applications that retrieve location information from the positioning system 236 to identify a geographic location of the in-vehicle information system 200 and to adjust the display of the virtual environment to correspond to the location of the in-vehicle information system 200. In navigation applications, the processor 204 identifies the location and movement of the in-vehicle information system 200 for the generation of routes to selected destinations and display of the routes in the 3D virtual environment.

In the in-vehicle information system 200, the display 232 is either an integrated display device, such as an LCD or other display device, which is integrated with a housing of the in-vehicle information system 200, or the display 232 is an external display device that is operatively connected to the in-vehicle information system 200 through a wired or wireless interface to receive output signals from the processor 204 to generate a display of hybrid 2D and 3D maps. In an embodiment where the in-vehicle information system 200 is an in-vehicle embedded computing device, the display 232 is an LCD or other flat panel display that is located in the console of a vehicle, or the display 232 is a head-up display (HUD) or other projection display that displays the 3D virtual environment on a windshield or other display surface in the vehicle.

Figure 3:
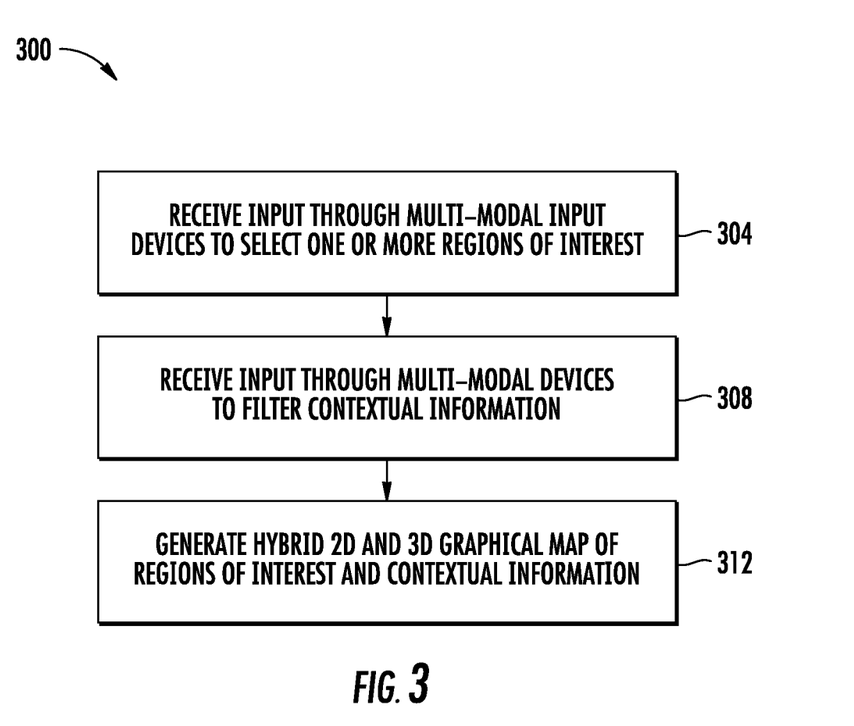
FIG. 3 is a diagram of a process for generating a hybrid 2D and 3D map with contextual data in a selected region of interest.

FIG. 3 is a block diagram of a process 300 for generation of 2D and 3D hybrid maps, such as the hybrid maps that are depicted in FIG. 1, in the system 200. During the process 300, the system 200 receives input from a user through the multi-modal input devices 234 to select a region of interest in a map display (block 304). In some embodiments, the graphical display device 232 generates a display of a 2D map to enable the user to select a region of interest that the system 200 subsequently displays with 3D terrain and feature models along with map context information. In some configurations, the input selects a specific region of interest, while in other configurations the user enters a search term that corresponds to two or more points of interest in different locations on the map.

Process 300 continues as the system 200 receives input from the user to filter the information that is displayed with the selected region of interest in the hybrid 2D and 3D map (block 308). The filtering information includes any input, such as gestures, spoken commands and search terms, or focused gaze input from the user to adjust the selection of information for display. For example, the system 200 receives a search query for vehicle refueling stations in a particular region of interest. The system 200 identifies any refueling stations in the region of interest and produces contextual information, such as a prominent 3D display of the refueling stations, POI labels of the stations, and additional contextual information such as the brand of each refueling station and optionally the current prices for each station. During the process 300, the filtering process and region of interest selection process can occur in any order or concurrently based on the user input to the system 200. Additionally, in some embodiments the system 200 generates a 2D and 3D hybrid map display and the user enters additional filter terms using the multi-modal input devices 234 to adjust the level of detail or other contextual information in the display of the 3D and 3D hybrid map.

Process 300 continues as the system 200 generates the display of the hybrid 2D and 3D map including the selected regions of interest and contextual information based on the input from the user (block 312). In the system 200, the CPU 212 and GPU 216 in the processor 204 process the 2D and 3D virtual environment data to generate a display of a 2D and 3D hybrid map along with the contextual information. In one embodiment, the system 200 generates an animation to depict buildings and other map features in the 2D and 3D hybrid map appearing to "grow" from a surface of a 2D map in a similar manner to the depiction of FIG. 1. The system 200 depicts portions of the hybrid map that are outside of regions of interest in the 2D mode to enable the user to concentrate on the more detailed information in only the region of interest. The system 200 also depicts contextual information such as POI labels, street names, time of day lighting effects, and weather effects based on the filtering information that the user provides through the multi-modal input devices 234.

Figure 4:
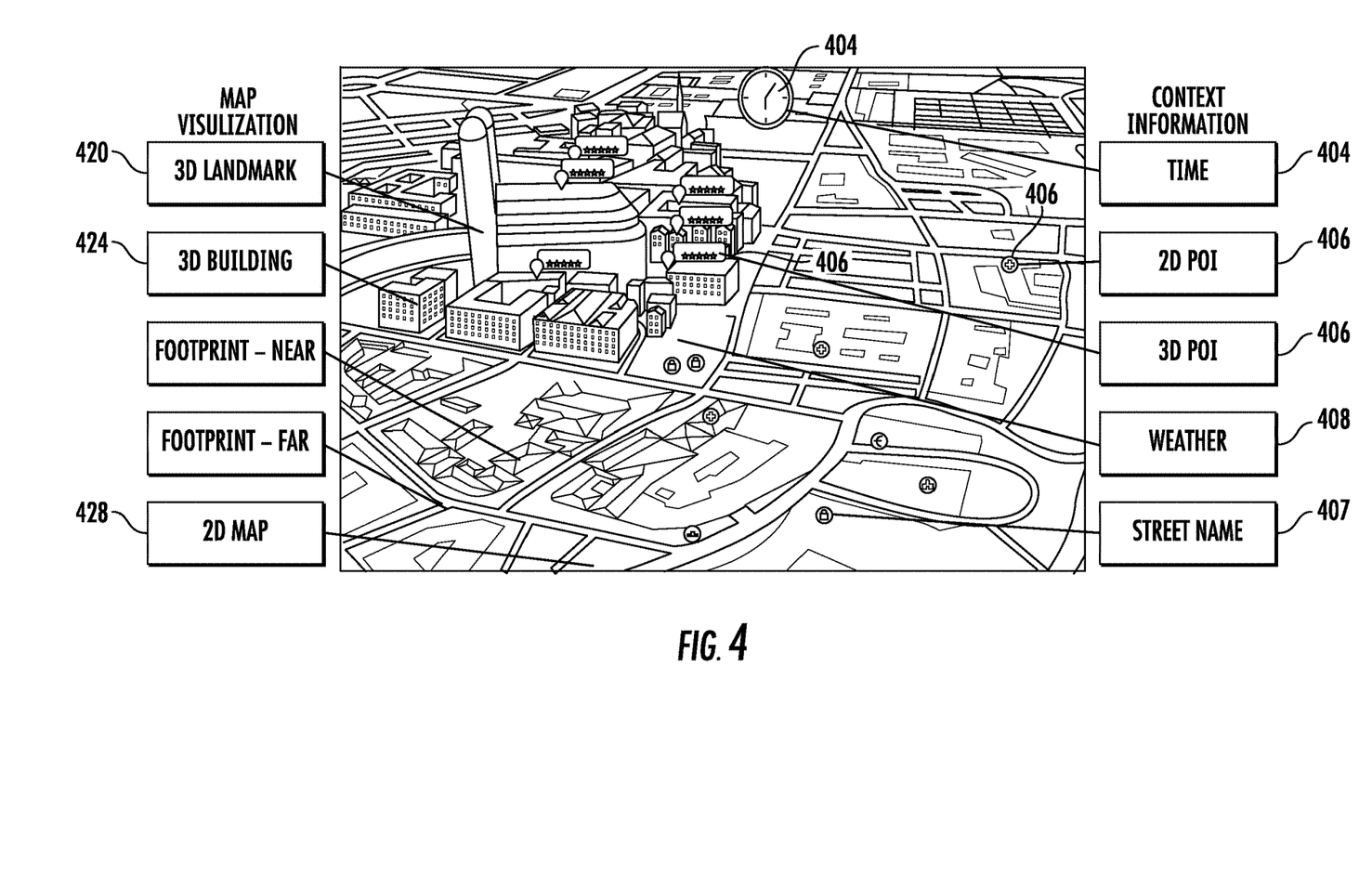
FIG. 4 is a display of hybrid 2D and 3D map elements that are depicted in the map displays of FIG. 1.

FIG. 4 depicts additional details of the 2D and 3D hybrid maps of FIG. 1. FIG. 4 depicts a hybrid 2D and 3D map with a 3D landmark 420 and 3D buildings 424 in a region of interest depicted on a larger 2D base map 428 that shows areas outside of the region of interest in only two dimensions. The map of FIG. 4 includes contextual information such as a clock 404, POI labels 406, street names 407, and the system 200 generates lighting and other graphical effects to depict the weather 408 and time of day around the region of interest. An important context is the time that the weather and lighting visualization is based on. In some use cases such as destination preview and destination search, the system will show the visualization based on projected arrival time and weather forecast. FIG. 4 depicts an analog clock on the upper right of the region of interest, in order to indicate the time of the visualization. The clock is also used to indicate time change during lighting and weather animation in these use cases. For example at time A the user previews a destination at time B, the clock hands rotate to change from time A to B, along with a time lapse of the weather and lighting effect shown in the region of interest.

A key visual cue that differentiates a day visualization and night visualization is artificial lighting. The systems 200 implements procedural window lighting and procedural road/street lighting into night visualization to provide more night-time hint and realistic appearance. For street light the system 200 procedurally generates street lamps along streets and applies standard deferred shading to let these lights illuminate a small region around each one of them. The lights will follow the same animation as that applies to buildings, and will only appear within the region of interest.

Icons and labels indicating POI locations and basic facts (type, reviews, and price range) give useful context information about a region on the map. On a 2D map, the system 200 generates different icons to mark different types of POIs. Within the region of interest, the 2D icons will be covered by 3D buildings, and there 3D POI labels rise with buildings to represent each POI and provide more details. Since the user will specify which type of POI is desired during the interaction when region of interest is specified, the set of POI display will be filtered. This reduces the total number of POI shown, and will allow more space for detailed information displayed in the label than what is available with 2D POI.

Street name facilitates better understanding of the urban layout and way-finding. The system 200 renders street name labels as a separate texture layer on top of terrain and road geometry. This allows them to be shown even when 3D contents are present. Note that while it is inevitable that road labels can be blocked by 3D buildings, the user can easily learn the street layout in 2D map during the interaction, thanks to the hybrid rendering and the intuitive interaction to adjust mixture of 2D and 3D contents. This is more convenient than pure 3D maps, in which the user must adjust the view angle to see the occluded labels.

The system 200 and the process 300 are suitable for multiple usage scenarios to assist a user during trip planning and navigation. Examples of usage scenarios for the system 200 and process 300 include, but are not limited to, destination preview, destination search, and virtual map exploration. These usage scenarios are described in more detail below.

In a destination preview scenario, a user or a driver usually previews a graphical display of the destination during a trip planning process. The system 200 provides a focus-and-context view of the destination with correct appearance of lighting and weather. Additionally, part of the route can also be highlighted together with the hybrid-dimensional visualization of the geographic region in the map. The user can have the flexibility to decide whether the destination should be highlighted, or the destination and the route should both be highlighted. The context of the destination will be deduced from the user's request or background information, including the projected arrival time and weather forecast. With this hybrid dimensional visualization, the user sees the appearance of the target building and surroundings to enable the user to recognize the destination upon arrival.

In a destination search scenario, the user searches for a specific destination without knowledge of the precise location of the destination. For example, a common search task is to find a specific type of POI within a selected area. When the system generations an option identifying multiple choices, the user selects one from the list to make the selected destination the destination of the trip. The system is configured to provide a list of POIs, and generates a 3D graphical depiction of the actual building corresponding to each POI in the map including environmental lighting and weather conditions that approximate the appearance of the building in the physical world. The user selects a destination using the realistic 3D graphical depictions of the POIs. For example, the user may recognize a building that he has visited before, or see some landmark that simply looks nice. The system enables the user to select a destination not only based on its text information (e.g., name, rating, price range), but also based on its appearance and surroundings.

In a virtual map exploration scenario, the user does not have a single destination in mind, but the user interacts with the system 200 to explore a geographical region, such as a city or other geographical area. The system 200 enables exploration through the simultaneous display of 2D and 3D contents, and enables simplified user interaction with the hybrid 2D and 3D map display. In one usage scenario, the user examines a layout of roads through the 2D map, and then selects portions of the 2D map to review the 3D contents in different regions of interest in the map. The user examines the relative locations of the buildings and structures in the selected 3D regions without having to view potentially confusing 3D data from other regions that are outside the region of interest. Additionally, the hybrid-dimensional 2D and 3D visualization provides different appearances of the geographic region at different time and weather conditions. The lighting and weather condition graphics provide valuable information, such as when will be the best time to visit the POI.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating map graphics including two-dimensional and three-dimensional elements comprising:
   generating, with a processor, a graphical display of a two-dimensional base map on a graphical display device;
   receiving, with a multi-modal input device, a user selection of a region of interest in the graphical display of the two-dimensional base map, the region of interest corresponding to only a portion of the graphical display of the two-dimensional base map;
   identifying, with the processor, (i) a first footprint region and (ii) a second footprint region in the graphical display of the two-dimensional base map, the first footprint region including the region of interest and a first portion of the graphical display of the two-dimensional base map outside of the region of interest, the second footprint region including the region of interest, the first footprint region, and a second portion of the two-dimensional base map outside of both the region of interest and the first footprint region; and
   generating, with the processor, on the graphical display device, (i) a three-dimensional graphical display of at least one first building located within the region of interest, (ii) a first two-dimensional graphical display of at least one second building located within the first footprint region and outside of the region of interest, the first two-dimensional graphical display including a top-down flattened three-dimensional view of the at least one second building, and (iii) a second two-dimensional graphical display of at least one third building located within the second footprint region and outside of both the region of interest and the first footprint region, the second two-dimensional graphical display including a two-dimensional outlined footprint of the at least one third building.

2. The method of claim 1, the generating further comprising:
   generating at least one of the first two-dimensional graphical display and the second two-dimensional graphical display including at least one two-dimensional graphic corresponding to a street name label or a point of interest label.

3. The method of claim 1 further comprising:
   receiving, with the processor, weather data corresponding to a weather condition in the region of interest; and
   generating, with the processor, a graphical effect in the region of interest depicting the weather condition in the region of interest on the graphical display device.

4. The method of claim 3 further comprising:
   applying, with the processor, a first lighting effect to the region of interest depicting a sunny weather condition, a second lighting effect to the region of interest depicting an overcast weather condition, and a third lighting effect to the region of interest depicting a rainy weather condition.

5. The method of claim 1, the receiving of the user selection of the region of interest with the multi-modal input device further comprising:
   receiving an input gesture corresponding to the region of interest on the graphical display of the two-dimensional base map with a touchscreen input device.

6. An in-vehicle mapping system comprising:
   a graphical display device configured to display two-dimensional and three-dimensional graphics including a map and features on a map;
   a multi-modal input device; and
   a processor operatively connected to the graphical display device and the multi-modal input device, the processor being configured to:
      generate a graphical display of a two-dimensional base map on the graphical display device;
      receive with the multi-modal input device a user selection of a region of interest in the graphical display of the two-dimensional base map, the region of interest corresponding to only a portion of the graphical display of the two-dimensional base map;
      identify (i) a first footprint region and (ii) a second footprint region in the graphical display of the two-dimensional base map, the first footprint region including the region of interest and a first portion of the graphical display of the two-dimensional base map outside of the region of interest, the second footprint region including the region of interest, the first footprint region, and a second portion of the two-dimensional base map outside of both the region of interest and the first footprint region; and
      generate, on the graphical display device, (i) a three-dimensional graphical display of at least one first building located within the region of interest, (ii) a first two-dimensional graphical display of at least one second building located within the first footprint region and outside of the region of interest, the first two-dimensional graphical display including a top-down flattened three-dimensional view of the at least one second building, and (iii) a second two-dimensional graphical display of at least one third building located within the second footprint region and outside of both the region of interest and the first footprint region, the second two-dimensional graphical display including a two-dimensional outlined footprint of the at least one third building.

7. The system of claim 6, the controller being further configured to:
   generate at least one of the first two-dimensional graphical display and the second two-dimensional graphical display including at least one two-dimensional graphic corresponding to a street name label or a point of interest label.

8. The system of claim 6, the controller being further configured to:
   receive weather data corresponding to a weather condition in the region of interest; and
   generate a graphical effect in the region of interest depicting the weather condition in the region of interest on the graphical display device.

9. The system of claim 8, the controller being further configured to:
   apply a first lighting effect to the region of interest depicting a sunny weather condition, a second lighting effect to the region of interest depicting an overcast weather condition, and a third lighting effect to the region of interest depicting a rainy weather condition.

10. The system of claim 6, the multi-modal input device further comprising:
    a touchscreen input device,
    wherein the processor is further configured to:

receive an input gesture corresponding to the region of interest on the graphical display of the two-dimensional base map with the touchscreen input device.

\* \* \* \* \*